March 10, 1970 R. L. PRITCHETT 3,500,066

RADIO FREQUENCY POWER TRANSISTOR WITH INDIVIDUAL CURRENT LIMITING CONTROL FOR THERMALLY ISOLATED REGIONS

Filed Jan. 10, 1968 6 Sheets-Sheet 1

INVENTOR
R. L. PRITCHETT
BY

ATTORNEY

United States Patent Office 3,500,066
Patented Mar. 10, 1970

3,500,066
RADIO FREQUENCY POWER TRANSISTOR WITH INDIVIDUAL CURRENT LIMITING CONTROL FOR THERMALLY ISOLATED REGIONS

Robert L. Pritchett, Stirling, N.J., assignor to Bell Telephone Laboratories, Incorporated, Murray Hill, N.J., a corporation of New York Filed Jan. 10, 1968, Ser. No. 696,936
Int. Cl. H03k *5/20*
U.S. Cl. 307—235 13 Claims

ABSTRACT OF THE DISCLOSURE

A radio frequency power transistor circuit: A plurality of power transistor cells are mutually in parallel, with each cell individually in series with a separate current limiter including a resistor, a separately biased control transistor, and a diode; thereby providing individual cell bias control.

FIELD OF THE INVENTION

This invention relates to semiconductor devices and circuits, and more particularly to a multiplet cell radio frequency transistor array with individual bias control circuits for each cell.

DESCRIPTION OF THE PRIOR ART

The parallel connection of a plurality of substantially identical electrical semiconductor translating elements, for example an array of power transistors, is a common technique for increasing the power handling capabilities of an electronic circuit. Although commonly used, this technique has heretofore proven quite difficult in actual application, due to the phenomenon known as "thermal runaway" or "second breakdown." This is generally caused by the fact that the resistance of semiconductor material decreases with increasing temperature; thereby causing a given power transistor cell, which is already hotter than the others due to its carrying a disproportionately large share of current, to increase further its share of current. As used herein, the term "cell" denotes a portion or region of the transistor array, including emitter base and collector zones, in which the temperature distribution therein is sufficiently uniform so as to produce a substantially uniform current density within that portion, or "cell," of the transistor array. Thus, a power transistor array with say $n$ transistor cells in parallel tends to behave at best as though it contained far fewer than $n$ cells in terms of its current and power capacities, and at worst such a transistor array has a tendency to malfunction due to the abnormally high current in one or a few cells.

The prior art has attempted to alleviate this problem of thermal runaway by means of the negative feedback provided by an individual resistor in series with the high current carrying terminal of each cell of the power transistor array, such as the emitter terminal of a common base transistor. However, it has been found that such a method is not very effective in obtaining anywhere near $n$ times the power from $n$ times the number of cells, which is theoretically the limit. Furthermore, inductive high current "kicks," due to switching in the presence of inductive loads, still may cause "burn-out" failure of the power transistor due to failure of the resistor effectively to control these high currents.

It is an object of the present invention to provide a power transistor array with more effective individual current-limiting feedback control against thermal runaway. Additionally, it is an object of this invention to prevent burn-out due to high currents caused by inductive kicks in the load attached to such an array.

SUMMARY OF THE INVENTION

In accordance with this invention, one high current carrying terminal (emitter or collector) of each cell of a power transistor array is controlled by means of one of an equal plurality of separate nonlinear current limiters. Typically, each of these nonlinear current limiters is supplied by the well-known nonlinear resistance from base to collector of a separately biased individual transistor. Advantageously, each power transistor cell should be substantially thermally isolated from the others thereby forming a plurality of "thermally isolated regions," so that the temperature of one cell or individual transistor does not influence the temperature, and hence current, of any of the others. This arrangement is contrary to the prior art in which temperature equalization is achieved by thermal coupling. Advantageously also, the radio frequency range of operation should have a lower limit which is at least about an order of magnitude greater than the reciprocal of the thermal time constant of each transistor cell. Additionally, in cases of Class C operation, typically an individual diode is put in series with each such current limiter in order to prevent reverse current from flowing, which otherwise is not limited by the nonlinear resistance from base to collector in the current limiter. In order that the alternating current component of current should not thereby itself be limited or degraded, a bypass capacitor is placed in parallel with each such current limiter including the diode, if any.

In a specific embodiment of this invention, a plurality of radio frequency transistor cells are formed in a single silicon wafer. The lower limit of the radio frequency here again should be understood to be at least about an order of magnitude higher than the reciprocal of the thermal relaxation time of the transistor cells in the wafer. Typically, this radio frequency is at least about 100 Megahertz, the thermal relaxation time being of the order of $10^{-7}$ seconds. Additionally, this radio frequency typically does not exceed approximately 10 Gigahertz, the upper limit consistent with reasonable power gain. Thermal isolation between cells is achieved by spacing each cell from its nearest neighbor in the silicon wafer at a distance which is at least twice as great as the largest dimension of a single cell. Each cell is connected in series with an individual bias control element in the form of an individual nonlinear current limiter.

The individual nonlinear current limiters are themselves formed by an equal plurality of "beam lead" control transistors (see U.S. Patent No. 3,335,338 to M. P. Lepselter, issued Aug. 8, 1967) and are constructed with individual resistors. These current limiters are connected to the power transistor cells so as to serve as individual bias control circuits for each of the power transistor cells in the wafer. Both the silicon wafer including the plurality of power transistors and the beam lead control circuits advantageously are mounted on a ceramic base, which has been coated both with layers of metal at appropriate positions and a suitable layer of electrically insulating dielectric. One of these layers of metal serves as a common plate of the by-pass capacitors for the high frequencies; the others serve as external contacts for the beam lead control circuits and the silicon wafer. The layer of dielectric serves as the dielectric for the by-pass capacitors. The bias control circuits themselves are connected to an adjustable voltage source of about two volts.

In this invention, furthermore, in each individual power transistor cell in the wafer, ranges of values for the optimal width X of the $\nu$ zone of a NP$\nu$N power transistor are established, by means of a mathematical analysis of the high frequency power gain and power output, as set forth in greater detail in the detailed description hereinbelow. It is found that generally the optimum value of this width X, corresponding to maximum power output, is not the same as the value of X corresponding to maximum power gain. Thus, in general at any frequency, there are at least two different optimum values of X, corresponding to maximum power gain and to maximum power output, respectively, thereby defining a range of values of X therebetween. This is referred to herein as the optimum range for power.

Likewise, for maximum power gain and power output, the net concentration of conductivity determining impurities in the $\nu$ one in the NP$\nu$N power transistor, in accordance with this invention, is related to the width X of the zone in the optimum range for power, and hence also to the value of the frequency of the current between the emitter and collector terminals of the NP$\nu$N transistor.

This invention together with its features, objects, and advantages may be better understood from the following detailed description when read in conjunction with the drawings in which.

Figure 1:
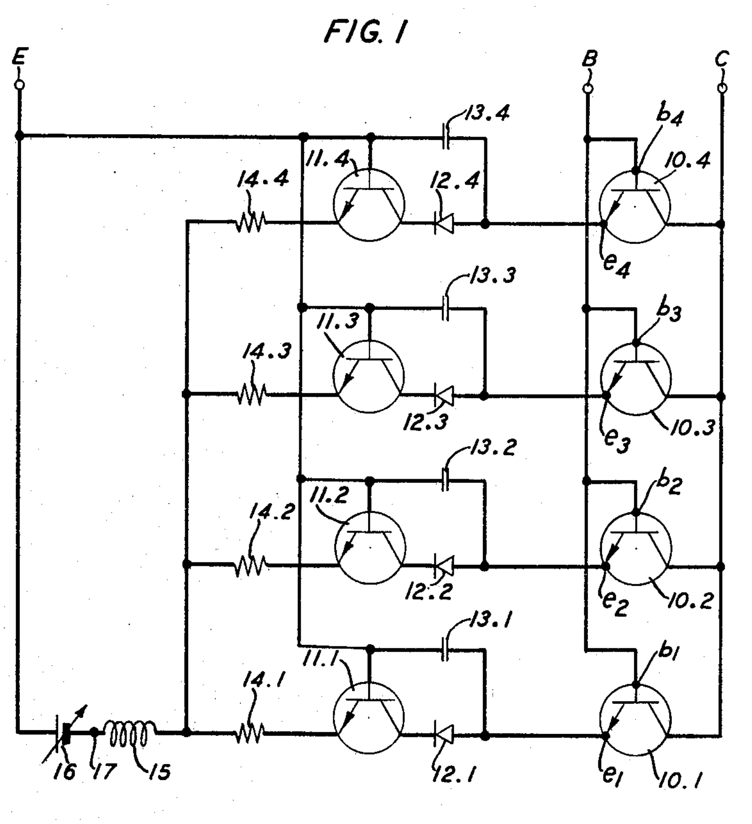
FIG. 1 is a schematic circuit diagram of a multiple cell transistor array with individual bias control circuits, in accordance with this invention.

Referring to the schematic circuit diagram shown in FIG. 1, a plurality of four NPN radio frequency power transistor cells are designated as transistors 10.1 through 10.4. Advantageously, they are all substantially identical. As known in the art, they all have their collector terminals electrically connected together, thereby forming the external collector contact terminal designated C. The electrical base terminals $b_1$–$b_4$ of these power transistors 10.1–10.4 are also all connected together, forming the external common base contact terminal designated B. Between each of the emitter terminals $e_1$ through $e_4$ of these power transistors 10.1 through 10.4 and the external emitter contact terminal designated E, NPN control transistors 11.1 through 11.4 respectively are electrically connected therein, among other items. It should be understood that as an alternative, the power transistors 10.1–10.4 could be PNP type, in which case the control transistor 11.1–11.4 are also PNP type; i.e., the power transistor and the control transistors are of "like sign." Typically, the control transistors 11.1–11.4 are also substantially identical, and serve the purpose of limiting the current through each of the power transistors 10.1 through 10.4. In this aforementioned electrical connection of control transistors 11.1–11.4, each of the emitters $e_1$–$e_4$ of each of the power transistors 10.1–10.4 is connected to each corresponding one of collectors of the control transistors 11.1–11.4, respectively, through diodes 12.1–12.4, respectively. These diodes are also typically substantially identical and are especially desirable to inhibit current through each of the power transistors 10.1–10.4 when "Class C" operation is contemplated. The electrical directional sense of the connection of these diodes 12.1–12.4 in the circuit is such as to inhibit current from flowing through the transistors 10.1–10.4 in a direction opposite to that determined by the ordinary external reverse bias voltage which is applied to the collector of these transistors. Stated in another way, the diodes 12.1–12.4 allow current to flow only in the same directional sense as the flow of minority carriers, in the bases of the power transistors 10.1–10.4, injected therein by the emitters thereof. Physically, the transistors 10.1–10.4 are advantageously spaced with sufficient distance between all of them for thermal isolation, that is, the heat flow from each of them is predominantly to a heat sink (not shown) and not to any one of the others.

The base terminals of each of the control transistors 11.1–11.4 are all connected together to form a single external contact designated E, the indirect external emitter contact for the power transistors 10.1–10.4 in the circuit diagram shown in FIG. 1. Capacitors 13.1–13.4 are also typically identical, and are connected between each of the emitter terminals $e_1$–$e_4$ of each of the power transistors 10.1–10.4 and the base terminals of the control transistors 11.1–11.4 (the latter base terminals being equivalent electrically to the external emitter contact terminal E). These capacitors 13.1–13.4, fabricated by methods known in the art, serve as radio frequency by-pass capacitors, thereby by-passing any control of radio frequency current presented respectively by the control transistors 11.1–11.4 or the diodes 12.1–12.4.

The emitters of each of the control transistors 11.1–11.4 are electrically connected to one of the terminals of each of the substantially identical resistors 14.1–14.4, respectively. The other terminals of the resistors 14.1–14.4 are connected together, and are also connected in series with inductive choke 15 and variable direct current voltage source battery 16 to the external emitter contact terminal E. Terminal 17, between the battery 16 and the choke 15, is useful in the fabrication of the circuit in a particular embodiment described below in connection with FIG. 3. The choke 15 ensures that substantially all the radio frequency current follows a direct path from E to the by-pass condensers 13.1–13.4 rather than through the path through battery 16, the resistors 14.1–14.4, and the emitters of the control transistors 11.1–11.4. Typically the electromotive force V of the battery 16 is set to about 2 volts in a direction which provides a forward voltage bias to the emitters of the control transistors 14.1–14.4. The maximum direct current allowed to flow through power transistor 10.1, for example, by reason of the individual bias control circuit (that is to say, in this example resistor 14.1, transistor 11.1, condenser 13.1, and diode 12.1), is thereby limited as desired to a value approximately equal to $V/R$, where R is the resistance of the resistor 14.1. Due to well-known effects, the direct current in the power transistors 10.1–10.4 respectively may tend, as V increases, to exceed this value of $V/R$, but only slightly for any reasonable values of V as known in the art.

Figure 2:
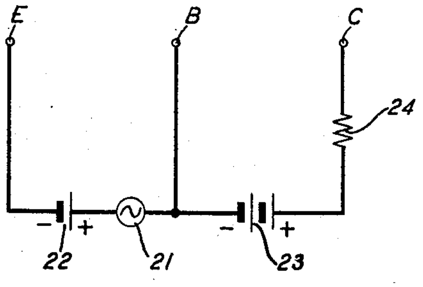
FIG. 2 is a schematic diagram of a particular use environment of the structure shown in FIG. 1.

As an example, FIG. 2 shows how the terminals designated E, B, and C in FIG. 1 are to be connected into a complete circuit useful for amplifying the radio frequency signals from a signal generator 21. The polarities of the sources of direct current bias voltage sources, batteries 22 and 23, are shown in FIG. 2 for the case where the power transistor cells 10.1–10.4 are basically NPN transistors. In case these power transistors are basically PNP transistors, the polarities of the bias voltage sources 22 and 23 should be reversed, as known in the art. In any event, the desired amplified signal will appear across the load impedance 24.

For typical operation at 4 Gigahertz, the control transistors 11.1–11.4 advantageously are of the beam lead variety; the by-pass condensers 13.1–13.4 each has a capacitance of 40 picofarads; and the resistors 14.1–14.4 each has a resistance of 100 ohms; and the choke 15 is 4 nanohenries. Typically, each of the power transistors 10.1–10.4 are designed to handle approximately 0.1 watt of R.F. power at 4 Gigahertz.

Figure 3:
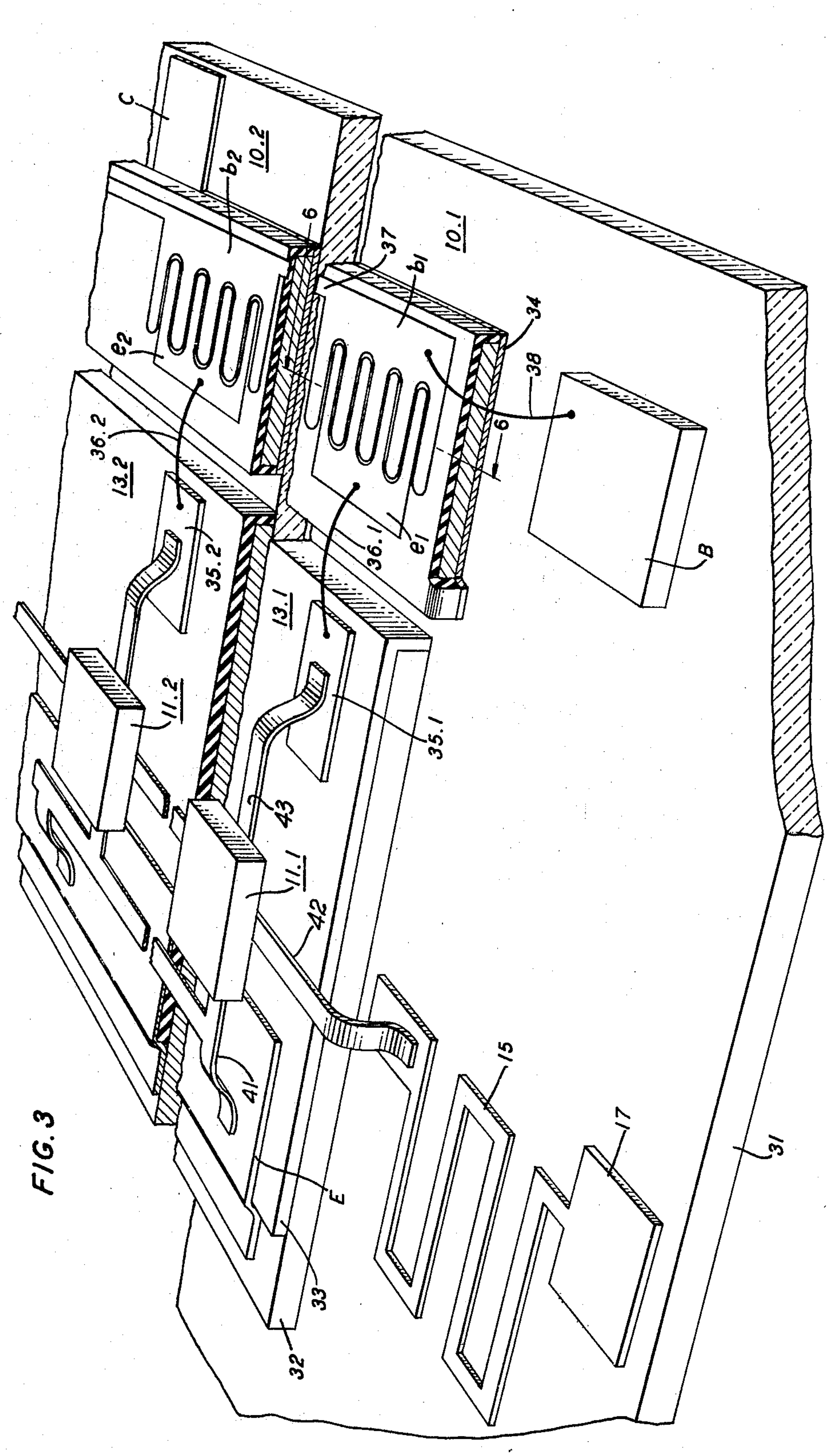
FIG. 3 is a perspective view not to scale of a multiple cell transistor structure, with individual bias control, in accordance with one specific embodiment of this invention.

FIG. 3 shows a specific embodiment, not to scale, of the circuit shown in FIG. 1, but omitting the battery 16. The entire circuit is attached to a ceramic substrate base 31. The control transistors 11.1–11.4 (of which only 11.1 and 11.2 are shown in FIG. 3) are electrically connected into the circuit by beam leads, well-known in the art and generally described by M. P. Lepselter, U.S. Patent No. 3,287,612 issued on Nov. 22, 1966 and No. 3,335,338 issued on Aug. 8, 1967. A metal layer 32, separated from metal capacitance pads 35.1–35.4 by means of an insulating layer 33, forms the by-pass capacitors 13.1–13.4

A choke 15 is a layer of zig-zag shaped metal terminating in terminal 17. The beam leads 41, 42, 43 of control transistor 11.1–11.4 are affixed to the terminal E, the choke 15, and the capacitance pads 35.1–35.4 for electrical connection of these control transistors into the rest of the circuit.

The power transistors 10.1–10.4 are integrated in a common monocrystalline silicon wafer with a common conducting layer 34 terminating in a collector contact terminal C. Leads 36.1–36.4 connect the emitter contact stripes $e_1$–$e_4$ of these power transistor cells 10.1–10.4 to the capacitance pads 35.1–35.4 respectively. These power transistors likewise have a common electrical base layer 37 connected by a lead 38 to common base terminal B.

To form the circuit shown in FIG. 3, it is preferable to select a ceramic substrate base 31, typically aluminum oxide or beryllium oxide about 0.6 inch thick; serving as the substrate for the entire circuit, and thereby furnishing mechanical support, good heat conduction but good electrical insulation. A conducting layer 32 of a good electrical conductor, such as aluminum is deposited on the ceramic base 31 to serve as one common plate of the bypass capacitors 13.1–13.4 shown in FIG. 1. Typically this layer 32 is 0.3 micron thick, and is deposited on the ceramic base 31 by means of a 0.05 micron layer of titanium serving as an adhesive therebetween, as known in the art. Photolithographic methods and selective etching, as known in the art, may be used to delineate the desired outer edges of this layer 32 after the deposition thereof over the entire surface of the ceramic base 31.

An insulating layer 33 is then deposited, or oxidized from a predeposited metal layer, to form the dielectric of the by-pass capacitors 13.1–13.4. Typically, the insulating layer 33 is made by first depositing a layer of tantalum about 0.3 micron thick upon the conducting layer 32 and selectively anodizing the tantalum layer to a depth of about 0.2 micron, to form the insulating tantalum oxide of relatively high dielectric constant, as known in the art. External common base contact terminal B, typically at least about 100 mils square, is deposited in a layer of a good electrically conducting material, such as gold. Also, the external emitter contact terminal E is deposited as a layer of a good electrical conductor, such as gold.

Likewise, a highly electrically conducting layer 34 of ohmic material, such as gold, deposited on the ceramic substrate 31, serves as the common connection for the ohmic collector contact terminal C of the power transistors 10.1–10.4. The choke 15 is also formed by a layer of a good electrical conductor, such as gold, deposited in a zig-zag pattern on the ceramic substrate 31. Typically, the choke 15 has about 3 or 4 rectangular loops. Capacitance pads 35.1–35.4 also consist of a layer of a good electrical conductor, such as gold, and are of the order of 20 mils square.

The elements E, B, 15, 17, 34, 35.1–35.4 typically are simultaneously obtained as layers deposited in the appropriate positions, by means of well-known photolithographic techniques followed by selectively etching away the undesired metal. For example, the entire surface of the ceramic substrate 31, with the layers 32 and 33 already deposited in place, is covered over its entire surface with an 0.05 micron layer of titanium (in order to adhere to the substrate) followed by an 0.5 micron layer of gold; thereafter the above mentioned photoresist and selective etching is carried out.

The control transistor 11.1–11.4 are fabricated as described in detail below. They are mechanically and electrically connected in place by well-known techniques, such as thermal compression bonding, onto appropriate capacitance pads as well as onto terminal E and one terminal of choke 15. Likewise, the power transistors 10.1–10.4 are fabricated as described below and are affixed on the layer 34 as shown in FIG. 1 by well-known techniques, such as thermal compression bonding. The emitter contact stripes $e_1$–$e_4$ of the power transistor cells 10.1–10.4 are connected to the respective capacitance pads 35.1–35.4 typically by means of gold leads 36.1–36.4 respectively, also by methods known in the art such as thermal compression bonding. The common electrical base contact layer 37, formed by the interconnection of the individual cell base contacts $b_1$–$b_4$ of the power transistor cells 10.1–10.4, is connected to the terminal B typically by means of a gold lead 38, by well-known methods such as thermal compression bonding.

Figure 3A:
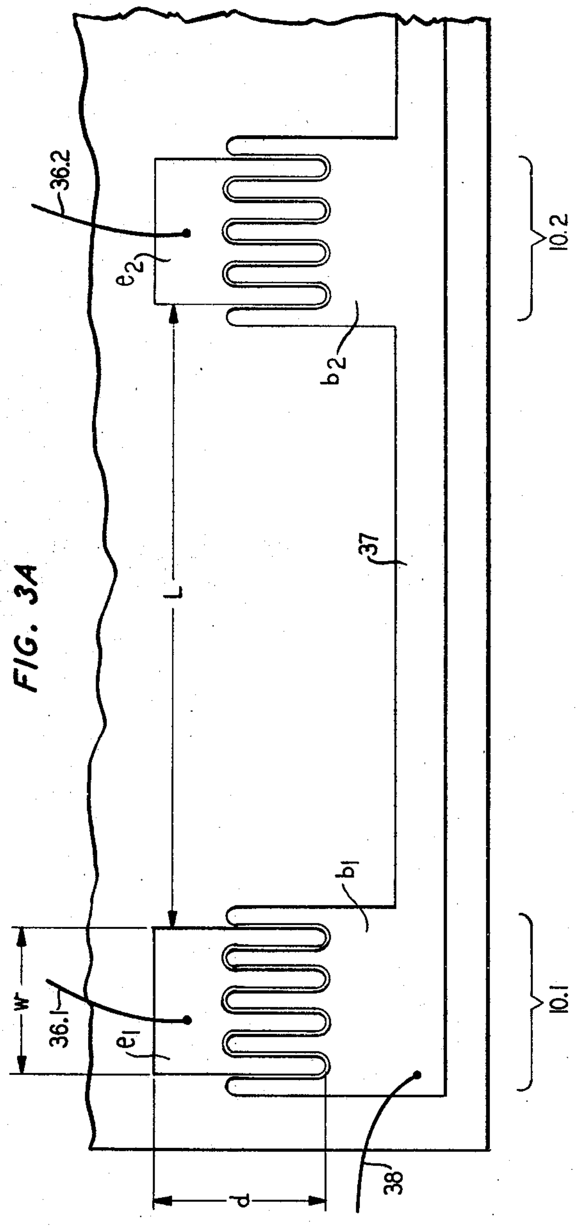
FIG. 3A is a top view of a portion of the transistor structure shown in FIG. 3.

It should be noted that it is advantageous to have the distance between neighboring transistor cells 10.1–10.4 large by at least a factor of two as compared with the largest dimension of the individual cells. Largest dimension of an individual cell is defined by the physical extent of its emitter contact stripe, such as $e_1$. This distance relationship can be better appreciated with reference to FIG. 3A, which is a top view of the power transistor cells 10.1 and 10.2 just described. Here, in FIG. 3A, the distance L between neighboring transistor contact stripes, $e_1$ and $e_2$ for example, advantageously is at least a factor of two greater than the physical extent $d$ and $w$ of the emitter contact $e_1$ in an individual cell thereof. Thereby thermal isolation between cells is achieved, and the temperature of one cell is not affected by the temperature of any other cell thermally isolated therefrom.

BEAM LEAD CONTROL TRANSISTORS

Figure 4:
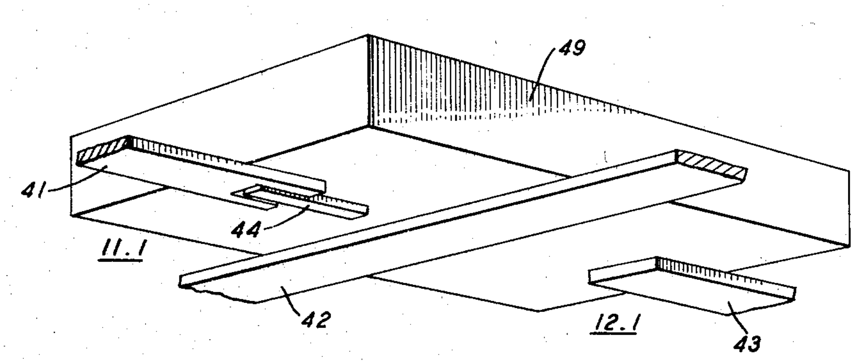
FIG. 4 is a perspective view, not to scale, of a portion of the structure shown in FIG. 3.

FIG. 4 shows a perspective view, not to scale, of the underside of a typical beam lead control transistor 11.1 shown in FIG. 3, including the diode 12.1 and the resistor 14.1 (not shown in FIG. 4, but shown in FIG. 5), both of which are formed by diffusion of impurities into the semiconductor material 49 of the transistor 11.1, as described more fully below in connection with FIG. 5. Beam leads 41, 42, 43 furnish mechanical support and electrical connections, whereas lead 44 merely furnishes an electrical connection.

Figure 5:
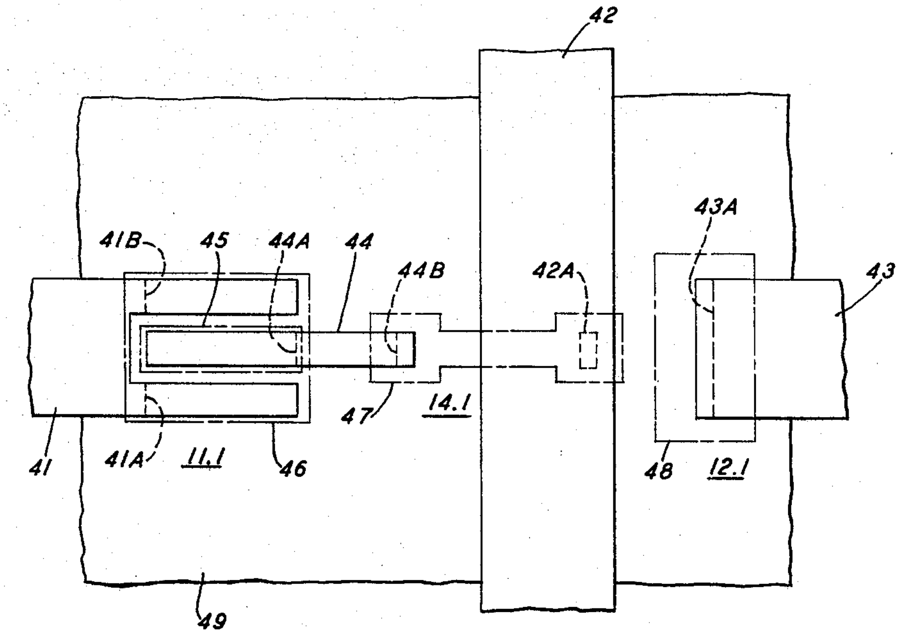
FIG. 5 is a plan view, not to scale, showing the outlines of the various conductivity type zones and metallization of a portion of the structure shown in FIG. 4.

FIG. 5 shows a plan view, not to scale, of the underside of this typical transistor 11.1, together with the beam leads 41, 42, 43 and the lead 44. The dotted lines 41A and 41B indicate the intersection at which the beam lead 41 cuts through an insulating passivation layer (not shown) and makes contact with the semiconductor material 49, typically silicon, as known in the art. Similarly, the dotted line 42A, 43A, 44A and 44B shows a similar intersection for the corresponding leads 42, 43 and 44. The broken center line 45 shows the outer contours of the typically N type conductivity silicon semiconductor forming the emitter zone of the transistor 11.1. Typically, this emitter zone is a 0.3 micron thick layer with a surface resistivity of 20 ohms per square, and has a rectangularly contoured dimension of approximately 10 microns×70 microns. By 20 "ohms per square" is meant that the resistivity averaged over the thickness of the layer and divided by the thickness of the layer is equal to 20 ohms. In another aspect, surface resistivity $\rho_s$ of a diffused region, of width W and length L between two terminals, is defined as $$\rho_s = R\frac{W}{L}$$

where R is the resistance of region between the two terminals. The broken line 46 similarly shows the outer contours of the typically P-type conductivity base zone of the transistor 11.1. Typically this base zone has a surface resistivity of 700 ohms per square, a thickness of approximately 0.15 microns, and a rectangularly contoured outer dimension completely surrounding the emitter zone 45. The broken center line 47 represents a typically P-type conductivity resistor zone of surface resistivity 50 ohms per square, thereby forming the resistor 14.1. The broken line 48 represents the outer contour of another typically P-type conductivity diode zone with a surface resistivity 50 ohms per square, forming the diode 12.1 by reason of its contact with the silicon layer 49 of opposite conductivity type from the diode zone within 48. The silicon semiconductor layer 49 is typically N-type conductivity silicon advantageously epitaxially grown with a thickness of 4 microns, and a resistivity of 4 ohm-cm. Underneath this layer 49 is a highly conducting 0.005 ohm-cm. layer (not shown) of monocrystalline silicon upon which typically the layer 49 has been grown epitaxially.

To form the transistor 11.1, an 0.005 ohm centimeter N-type monocrystalline silicon wafer, 125 microns thick, is used as a substrate for epitaxially growing the 4 ohms centimeter, 4 microns thick silicon layer 49. Thereafter, the base zone 46 is diffused into the layer 49, using boron as the acceptor impurity. Thence, emitter zone 45 is diffused with phosphorus as the donor impurity. The resistor zones 47 and the diode zone 48 advantageously are diffused simultaneously through appropriate masks, as known in the art, with boron as the impurity. It should be noted in cases where the diode 12.1 is not desired, the diffusion of zone 48 may be omitted by suitable masks during the diffusion. In all diffusions, standard photoresist and masking techniques may be advantageously utilized to delineate the outer contours of the desired conductivity type zones, as known in the art.

Radio frequency power transistor cells 10.1–10.4

Figure 6:
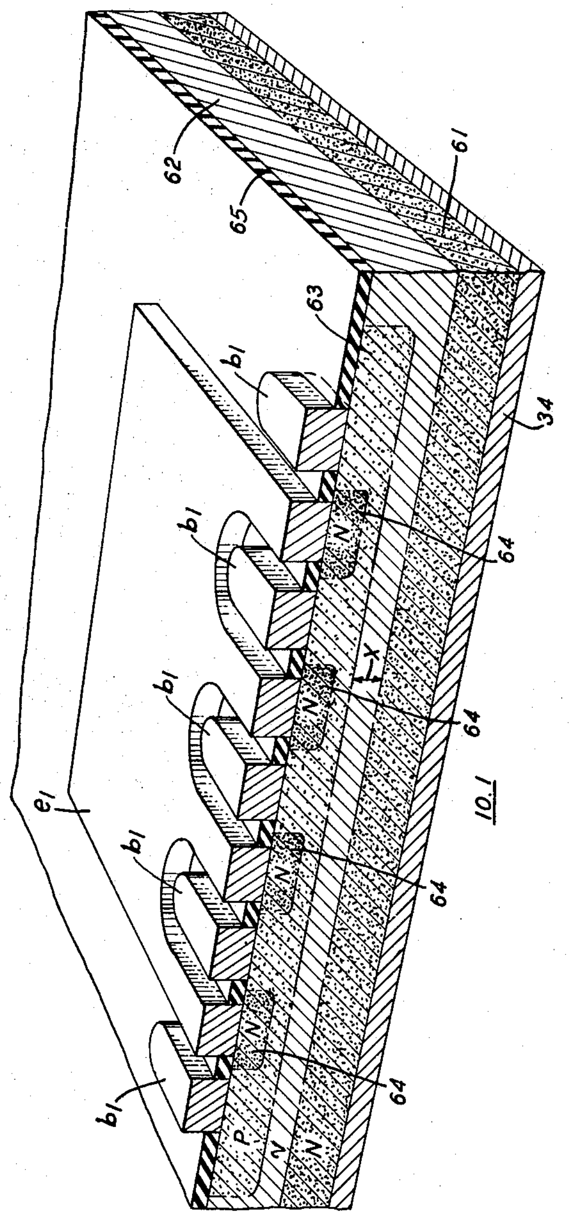
FIG. 6 is a sectional perspective view, not to scale, of another portion of the structure shown in FIG. 3.

FIG. 6 shows a cross sectional perspective view, not to scale, of a portion of a typical NP$\nu$N power transistor cell 10.1, shown in FIG. 3. It should be understood that an NP$\nu$N structure is a special case of an NPN transistor structure. An N-type monocrystalline silicon semiconductor substrate 61 of relatively high conductivity serves as the power transistor collector as well as a substrate for the epitaxial layer 62 of lightly doped $\nu$ type conductivity silicon. This $\nu$ type conductivity region serves as the power transistor collector space. Zone 63 is P-type conductivity silicon, serving as the base zone. Zones 64 are N-type conductivity silicon serving as emitters. A passivation layer 65, typically an oxide of silicon, serves as a protector of the transistor from the ambient. Through this oxide and touching the semiconductor are the fingerlike projections of the emitter contact stripes $e_1$, and the fingerlike projections of the base contact terminal $b_1$.

To form the transistors 10.1–10.4, a silicon wafer 61 of resistivity of $5\times10^{-3}$ ohm centimeters and a thickness of approximately 125 microns is used as a substrate for growth of an epitaxial layer 62 thereon, of thickness 4 microns and a net donor impurity concentration of the order of $10^{+15}$ per cubic centimeter, as more fully set forth below under the discussion of Characteristics of the $\nu$ Zone. Thereafter, the P-zone 63 for each transistor cell 10.1–10.4 is diffused into the epitaxial layer 62 through suitable masks, by methods known in the art, to a depth of approximately 0.4 micron and a surface resistivity of 700 ohms per square (as measured after the subsequent emitter diffusion). Typically, boron is used as the predominant acceptor impurity for this diffusion of the base zone 63. The outer contour of this zone 63, for each of the transistor cells 10.1–10.4, is rectangularly shaped with an overall dimension of approximately 40×50 microns to surround completely the emitter stripe zones 64 to be formed subsequently. This outer contour for each of the base zones of each of the power transistor cells 10.1–10.4 thereby electrically isolates each of the base zones from one another, but only insofar as conduction from a base zone of one cell to a base zone of another cell through the diffused P-type zone 63 itself. All base zones are electrically connected to each other, however, by the common base contact layer 37, as shown in FIG. 3. In this way, capacitance is minimized from base to collector of each of the power transistor cells 10.1–10.4.

The emitter stripe zones 64 are themselves thereafter diffused into the silicon wafer 61 with phosphorous as a donor type impurity, to a depth of about 0.3 micron and a surface resistivity of 20 ohms per square. The emitter and the base contacts, for example $e_1$ and $b_1$ respectively, together with the common base contact layer 37, are formed of aluminum by methods known in the art, such as evaporation. Typically, each of the fingers in the emitter and base contacts, for example $e_1$ and $b_1$, has a dimension of approximately 2 microns×50 microns, with approximately 2 microns spacing between each successive one of these interdigitated emitter and base contact fingers.

CHARACTERISTICS OF THE $\nu$-ZONE

Figure 7:
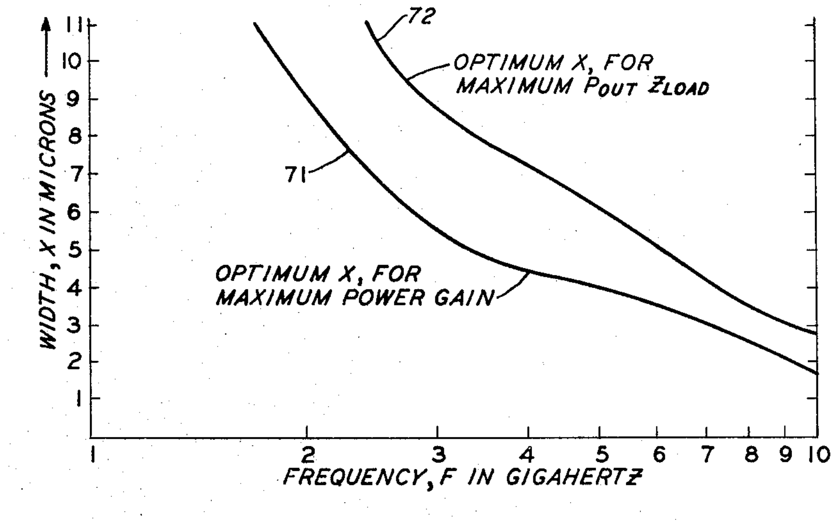
FIG. 7 shows plots of the width denoted by X of the $\nu$ zone versus operating frequency for the structure shown in FIG. 6 for optimum performance according to this invention.

In the operating frequency range of between about 0.5 Gigahertz and about 10 Gigahertz, curve 71 in FIG. 7 shows the optimum value of X, the width of the $\nu$ zone of the power transistor cells 10.1–10.4, versus frequency F, for maximum power gain; while curve 72 in FIG. 7 shows the optimum value of X for maximum $P_{out}\,Z_{load}$, that is to say, maximum power output multiplied by external load impedance. By power gain is meant the ratio of power output to power input. Curve 71 may be approximated by $X=30/F$; and curve 72 by $X=15/F$, where X is measured in microns and F in Gigahertz. At a given operating frequency, F, the value of X for maximum power gain is thus not the same as for maximum $P_{out}\,Z_{load}$. Thus, a compromise may be necessary, depending upon the relative importance of the desired maximum power gain as against maximum power output.

Figure 8:
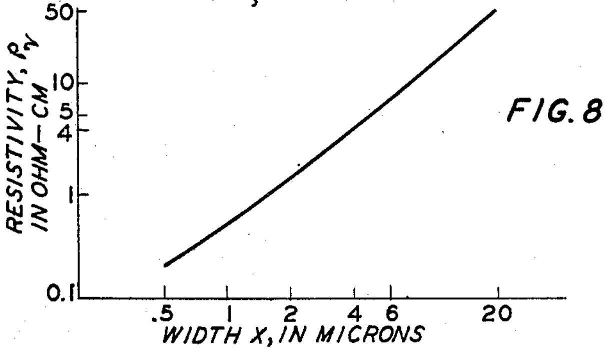
FIG. 8 shows a plot of optimum resistivity of the $\nu$ zone versus frequency of operation, for optimum performance of the structure shown in FIG. 6, according to this invention.

In any event, it is advantageous for operating frequencies in the 0.5 to 10 Gigahertz range, that a definite prescription be followed in determining the net predominant donor impurity concentration of the $\nu$ zone in the NP$\nu$N structure. This prescription is that this impurity concentration be such as to make the resistivity of the $\nu$ zone $\rho_\nu$ in ohm-centimeter equal to or greater than about $$\rho_\nu \geqq 0.5(X)^{1.6} \quad (1)$$

but greater by no more than a factor of 5, where X is measured in microns. The relationship defined by Eq. (1) is illustrated by FIG. 8. Since the width of the typically diffused zones forming the emitter zone 64 and base zone 63 are typically much less than the width X of the $\nu$ zone, it follows that X may be approximated as the width of the whole epitaxial $\nu$ layer 62 into which the base and emitter zones typically are diffused. This approximation is useful in calculating the preferred resistivity of the $\nu$ zone in the prescription given above in Eq. (1).

Figure 9:
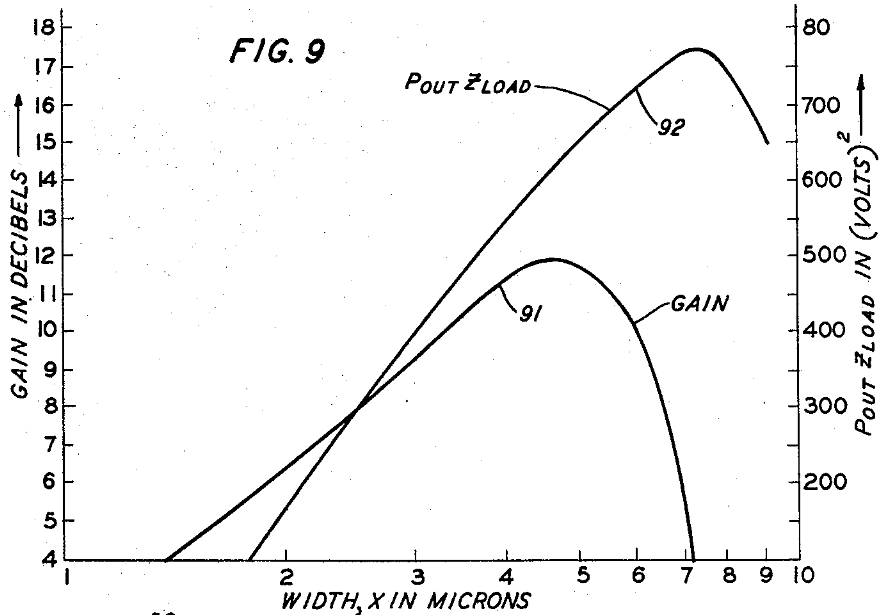
FIG. 9 shows plots of typical performance characteristics of the structure illustrated in FIG. 6.

In FIG. 9, curves 91 and 92 respectively show the relationships between the power gain and $P_{out}\,Z_{load}$ respectively, and the width X of the $\nu$ zone for a typical transistor cell 10.1 at 4 Gigahertz operation. It should be understood that the ordinate of the curve 91 for power gain contains an additive constant which depends, among other factors, upon the lateral dimension of the emitter's finger-like stripes. This additive constant has been selected in curve 91 such that this dimension is approximately 2 microns, a size well within present state of the art. These curves 91 and 92 show the critical nature of proper design of this width X, especially in order to ensure reasonably high power gain at a given operating frequency. Hence, for proper design, X should be selected within the range of about 10/F and 30/F.

Although this invention has been described in terms of specific embodiments, it should be clear to those skilled in the art that other embodiments are obvious which are within this invention.

What is claimed is:

1. In combination:

(a) a plurality of power transistors, each of said power transistors having first and second high current carrying terminals consisting of the emitter and collector terminals thereo;

(b) a plurality of nonlinear current-limiting devices;

(c) a plurality of bypass capacitors;

(d) a plurality of first conductive means for connecting each of said capacitors in an electrical parallel relationship with a different one of said nonlinear current-limiting devices, to form a plurality of bias control circuits each of which having at least a first and a second control terminal;

(e) a plurality of second conductive means for connecting the first control terminal of each of said bias control circuits separately to a different one of each of said first high current carrying terminals, to form a plurality of current-limited power transistors;

(f) a plurality of third conductive means for connecting the second high current carrying terminals to a common third terminal, in order to put the current-limited power transistors in a mutual electrical parallel relationship; and (g) a plurality of fourth conductive means for connecting together all the second control terminals to a fourth terminal.

2. A combination in accordance with claim 1 in which each of the said plurality of nonlinear current-limiting devices comprises a control transistor.

3. A combination in accordance with claim 1 in which each of the said plurality of nonlinear current-limiting devices comprises:

(a) a control transistor, containing an emitter therein; and (b) a resistor electrically connected in series with said emitter.

4. A power signal translating device in accordance with claim 3 in which the fourth conductive means includes beam leads, and in which each said resistor comprises a diffused region in a portion of the semiconductor material which forms the said control transistor.

5. A power signal translating device in accordance with claim 3 in which the said plurality of nonlinear current-limiting devices further comprises a radio frequency choke, and in which is provided means to connect said choke in an electrical series relationship with the said plurality of control transistors.

6. A power transistor circuit in accordance with claim 1 in which each of the power transistors has an NP$\nu$N conductivity type emitter zone, base zone, collector space, collector terminal zone structure, each of the said power transistors having an emitter contact stripe, and in which all the zones of all said power transistors are in a single monocrystalline semiconductor, the distance between the emitter contacts of neighboring transistors being at least a factor of two greater than the largest dimension of the individual emitter contact stripes, thereby furnishing thermal isolation between said power transistors.

7. A power signal translating device in accordance with claim 6 in which the resistivity $\rho$ in ohm-centimeter is related to the width X in microns of the $\nu$ zone, such that $\rho$ is in the range defined at its lower limit as equal to about $0.5(X)^{1.6}$ and at its upper limit as about a factor 5 greater than said lower limit.

8. A power signal translation device which comprises:

(a) a plurality of power transistors, each having first and second high current carrying controlled terminals;

(b) a plurality of unidirectional nonlinear current-limiting devices;

(c) a plurality of unidirectional current inhibitors;

(d) means for connecting each of the said current-limiting devices in electrical series relationship with a different one of each of said current inhibitors, to form a plurality of current control circuits;

(e) a plurality of bypass capacitors;

(f) a plurality of first conductive means for connecting each of said capacitors in electrical parallel relationship with a different one of said current control circuits to form a plurality of bias control circuits;

(g) a plurality of second conductive means for connecting each of said bias control circuits to a different one of said first controlled terminals, to form a plurality of current-limited transistors;

(h) a plurality of third conductive means for connecting together the second controlled terminals to a third terminal to put the current-limited transistors in a mutual electrically parallel relationship; and (i) a plurality of fourth conductive means for connecting together the current-limiting devices in a mutual parallel electrical relationship.

9. A power signal translating device in accordance with claim 8 in which each of the unidirectional current-limiting devices comprises a control transistor, and in which the fourth conductive means includes beam leads.

10. A signal translating device which comprises:

(a) a power transistor having an NP$\nu$N conductivity type zone structure;

(b) means to cause a current of frequency F between about 0.5 Gigahertz and about 10 Gigahertz to flow in the transistor; and in which the width X, measured in microns, of the $\nu$ zone of the transistor is related to the said frequency F, measured in Gigahertz, such that X is in the range between about 10/F. and about 30/F.; and in which the resistivity $\rho$ in ohm-centimeter of the said $\nu$ zone is in the range defined at its lower limit as equal to about $0.5(X)^{1.6}$ and at its upper limit as equal to about a factor 5 greater than said lower limit.

11. A signal translating device comprising:

a first plurality of power transistors, each of which has an NP$\nu$N (emitter, base, collector space, collector terminal) conductivity type zone structure, in which the width X, measured in microns, of the $\nu$ zone is less than 10 microns; and in which the resistivity $\rho$ in ohm-centimeter of the said $\nu$ zone is in the range defined at its lower limit as equal to about $0.5(X)^{1.6}$ and at its upper limit as equal to about a factor 5 greater than said lower limit, each said transistor having a second plurality of emitter zones and a third plurality of base zones, all the said emitter zones, base zones, collector spaces and collector terminal zones of all the said power transistors being in a single crystal semiconductor, and the distances between each of the power transistors being a factor of at least two greater than the largest dimension of any individual one of the power transistors, thereby thermally isolating the power transistors from one another.

12. A transistor circuit comprising:

(a) a plurality of power transistors;

(b) a common first terminal to which each of the collectors of the power transistors is electrically connected;

(c) a common second terminal to which each of the bases of the power transistors is electrically connected;

(d) an equal plurality of control transistors;

(e) a common third terminal to which the emitter of each of the control transistors is electrically connected by way of electrically resistive means;

(f) a common fourth terminal to which the electrical bases of each of the control transistors is electrically connected;

(g) unidirectional conductive means for electrically connecting the collectors of each of the control transistors to a different emitter of each of the power transistors, thereby allowing the conduction of current only in that direction which is in the same sense as that of the current flow of minority carriers in the electrical bases of the power transistors injected by the emitters thereof; and (h) capacitance means for connecting the bases of each of the control transistors to a different emitter of each of the power transistors, to provide an alternating current by-pass therebetween.

13. A transistor array according to claim 12 in which the plurality of power transistors are all in the same semiconductive wafer but are thermally isolated from one another.

References Cited

UNITED STATES PATENTS

| | | | |
|---|---|---|---|
| 3,225,261 | 12/1965 | Wolf | 317—235 |
| 3,381,183 | 4/1968 | Turner et al. | 317—235 |
| 3,394,268 | 7/1968 | Murphy | 317—235 |
| 3,416,043 | 12/1968 | Jorgensen | 317—235 |

JERRY D. CRAIG, Primary Examiner

U.S. Cl. X.R.

307—243, 296; 317—235